United States Patent [19]

Dixon et al.

[11] Patent Number: 4,834,772
[45] Date of Patent: May 30, 1989

[54] BATTERY ELECTROLYTE

[75] Inventors: Brian G. Dixon, Sandwich; John R. Deans, East Falmouth; Leah B. Jenney, Marion, all of Mass.

[73] Assignee: Cape Cod Research, Inc., Buzzards Bay, Mass.

[21] Appl. No.: 161,108

[22] Filed: Feb. 26, 1988

[51] Int. Cl.$^4$ .......................... H01M 6/14; H01M 6/00
[52] U.S. Cl. .................................... 29/623.5; 429/189; 429/190
[58] Field of Search ................ 429/190, 189; 29/623.5

[56] References Cited

U.S. PATENT DOCUMENTS

| | | | |
|---|---|---|---|
| 3,870,564 | 3/1975 | Takamura et al. | 429/190 |
| 3,871,918 | 3/1975 | Viescon | 429/190 |
| 4,018,971 | 4/1977 | Sheibley et al. | 429/190 X |
| 4,258,110 | 3/1981 | Alvarez et al. | 429/190 X |

*Primary Examiner*—Stephen J. Kalafut

[57] ABSTRACT

A polymeric gelled electrolyte and the method for preparing the novel polymeric elelctrolyte in a crosslinked and noncrosslinked state is disclosed. The polymeric electrolyte is prepared from chitosan which may be crosslinked with aldehydes or remain uncrosslinked and form a superior electrolyte upon gelling in alkaline liquid.

11 Claims, No Drawings

BATTERY ELECTROLYTE

This invention was made with Government support under Contract No. F33615-86-C-2676 awarded by the Department of Defense. The Government has certain rights in this invention.

BACKGROUND OF THE INVENTION

The present invention relates to the art of electric batteries employing alkaline electrolyte and particularly concerns a novel battery electrolyte.

A thickened or gelled electrolyte is less likely to leak from an electrochemical cell. Many materials have been used as thickening or gelling agents in the past. Such agents include soluble thickeners, insoluble absorbents such as starch, various cellulosic materials such as methyl cellulose, and some synthetic polymers.

A recurring problem with agents used heretofore has been that, on standing or during cell discharge, liquid separated from many of the thickened solutions or gels. This liquid was then able to leak out of cells.

Another drawback to the use of some known agents is that they were subject to chemical attack by the strong basic electrolyte solutions employed in alkaline type cells. Similarly, some agents also attacked or were attacked by the various components of the cell. The decomposition products resulting from these reactions adversely affected the performance of many cells.

In cells designed for delivering high current short duration pulses, it is important to minimize the internal resistance by reduction of the conduction path length. Heretofore this has been achieved through the use of inert mechanical separators and frames which complicate the assembly of the battery.

The use of water-insoluble or water absorbable agents such as those disclosed in U.S. Pat. Nos. 2,872,362 and 4,288,913 do not consistently form highly uniform and mechanically tough gels.

SUMMARY OF THE INVENTION

In the manufacture of an electrochemical cell comprised of an anode, an aqueous gelled alkaline electrolyte, and a cathode, a method has now been discovered by which the aqueous gelled alkaline electrolyte can be formed in situ by first coating the anode, the cathode, and/or a microporous separator with a solution comprising mucopolysaccharides dissolved in acidic aqueous solution; followed by dipping said coated structure into alkaline liquid. This novel method results in gelling of the coating. Surprisingly the coating takes on the desirable electrochemical properties of the alkali while retaining the desirable mechanical properties of a gel. Addition of crosslinking agents to said gelled electrolyte produces gelled coatings with sufficient strength to entirely eliminate the need for an inert battery separator. Alternatively, this can be accomplished by initially crosslinking said mucopolysaccharides followed by contacting with alkaline liquid.

DESCRIPTION OF THE PREFERRED EMBODIMENT

The preferred means for maintaining uniform and mechanically stable electrolyte are mucopolysaccharides such as chitosan. The chitosan employed in the present method is a commercially available material which is prepared by the deacetylation of chitin by treatment of the chitin with hot concentrated aqueous potassium or sodium hydroxide (40–50%). Chitin has been known as the organic skeletal substance in shells of crustacea (crabs, lobsters, shrimp, etc.), in insects, and in some fungi for nearly one hundred years. It has been found to be a linear polymer of N-acetyl-2-deoxy-2-amino glucose with a 1–4 beta linkage between the monomer units analogous to the structure of cellulose. For an essentially complete coverage of the structure, isolation and purification of chitin see Riccardo A. Muzzarelli, "Chitin", (Pergamon Press Ltd., Elmsford, N.Y., 1977).

Chitosan of shell fish origin is preferred for use in the present invention and is commercially available from Pfaltz & Bauer, Stanford, CT; from Protan, Redmond, WA; and from Madera Products, Inc., Albany, OR. Preferred coating solutions are formed by dissolving chitosan in a dilute aqueous solution of an organic or inorganic acid, most preferably at about 1–3% by weight. While a broad range of choices is acceptable, acetic acid, citric acid, gluconic acid and tartaric acid are the preferred organic acids, and hydrochloric acid and sulfuric acid are the preferred inorganic acids.

Said chitosan solution forms a thin adherent film or layer on the surfaces of the electrochemical cell components. This layer is formed into a uniform transparent gel by contacting with an alkaline solution. The alkali used in the present invention include, but are not limited to, sodium, potassium and/or lithium hydroxide.

It was unexpectedly found that superior ionic conductivity and electrochemical activity result from the use of strong alkali. The gel takes on over 90% of the very desirable electrochemical properties of said alkaline solution while developing the mechanical properties of solids.

The mechanical strength of said film may be improved by subsequent treatment of said gel in a dilute aqueous solution containing organic aldehydes. A wide variety of organic aldehydes can be employed in the present method, such as those of the general formula I: OHCXCHO wherein X is a single bond (OHC—CHO, glyoxal) or is an alkyl or aryl group of about 1-12 carbon atoms. Polyaldehydes, wherein X contains one or more CHO groups, can also be employed in the present method. Compounds which are converted to aldehydes in aqueous acid are included within the scope of the term "aldehyde". Such compounds include the lower alkyl acetals and hermiacetals of the compounds of formula I such as malonaldehyde diethylacetal. Preferred compounds of formula I include glyoxal and glutaraldehyde. The organic aldehyde is preferably mixed with the aqueous acidic chitosan solution to the extent of about 0–5%, preferably about 1–2% by weight.

It was unexpectedly discovered that anode and/or cathode structures coated with thin layers of gelled and crosslinked (or crosslinked and gelled) chitosan become sufficiently electrically insulated so that no inert separators are required. This unexpectedly allows for inter-electrode spacings of between 0.0005 and 0.004 inches. Heretofore interelectrode spacings required separators of thickness of at least 0.010 inches.

The material useful in the anodes and cathodes of the present invention can be of any material generally used in cells having an alkaline electrolyte. Such materials include metals, carbon and metal oxides well known in the art, used either alone or in various combinations.

A separator can be employed in the present invention between the coated anode and coated cathode structures. Such separators are similar to those well known in the art and used in various electrochemical cells. Useful separator materials include, but are not limited to, porous cellulose, plastic and glass materials. The separator may also be coated according to this invention with chitosan gel and said coated separator contacted by anode and cathode structures. This arrangement is especially effective for the construction of batteries built from foil electrodes.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A method for forming a cell having a gelled electrolyte, said method comprising:
   (a) coating the anode structure and/or the cathode structure with a liquid comprising mucopolysaccaride dissolved in dilute acid,
   (b) contacting said coating with alkaline liquid to gel said coating,
   (c) contacting anode structure with cathode structure via said gel coating.

2. The method of claim 1 wherein said mucopolysaccaride comprises chitosan.

3. The method in claim 2 wherein said diluted acid is selected from the group consisting of organic carboxylic acids and/or inorganic acids such as hydrochloric acid and sulfuric acid.

4. The method of claim 1 further comprising:
   (a) coating a porous separator with a liquid comprising mucopolysaccaride dissolved in dilute acid,
   (b) contacting said coated separator with said alkaline liquid,
   (c) contacting said anode structure with said cathode structure via said gel coated separator.

5. The method of claim 1 wherein said alkaline liquid is an aqueous electrolyte of 5 to 80 w% lithium, sodium or potassium hydroxide.

6. A method for forming a cell having a crosslinked gelled electrolyte, said method comprising:
   (a) coating the anode structure and/or the cathode structure with a liquid comprising mucopolysaccaride dissolved in dilute acid.
   (b) contacting said coating with alkaline liquid to gel said coating,
   (c) contacting said gel coating with an amount of crosslinking agent prepared in appropriate solvent to crosslink said gel coating,
   (d) contacting anode structure with cathode structure via said crosslinked gel coating.

7. The method of claim 6 wherein said mucopolysaccaride comprises chitosan.

8. The method in claim 6 wherein said dilute acid is selected from the group consisting of organic carboxylic acids and/or inorganic acids.

9. The method of claim 6 further comprising:
   (a) coating a porous separator with a liquid comprising mucopolysaccaride dissolved in dilute acid,
   (b) contacting said coated separator with alkaline liquid to gel said coating,
   (c) contacting said gelled coated separator with an amount of crosslinking agent prepared in appropriate solvent to crosslink said gel coating,
   (d) contacting said anode structure with said cathode structure via said crosslinked gel coated separator.

10. The method of claim 9 wherein said crosslinking agent is an organic aldehyde.

11. The method of claim 6 wherein said alkaline liquid is an aqueous electrolyte of 5 to 80 w% lithium, sodium or potassium hydroxide.

* * * * *